UNITED STATES PATENT OFFICE.

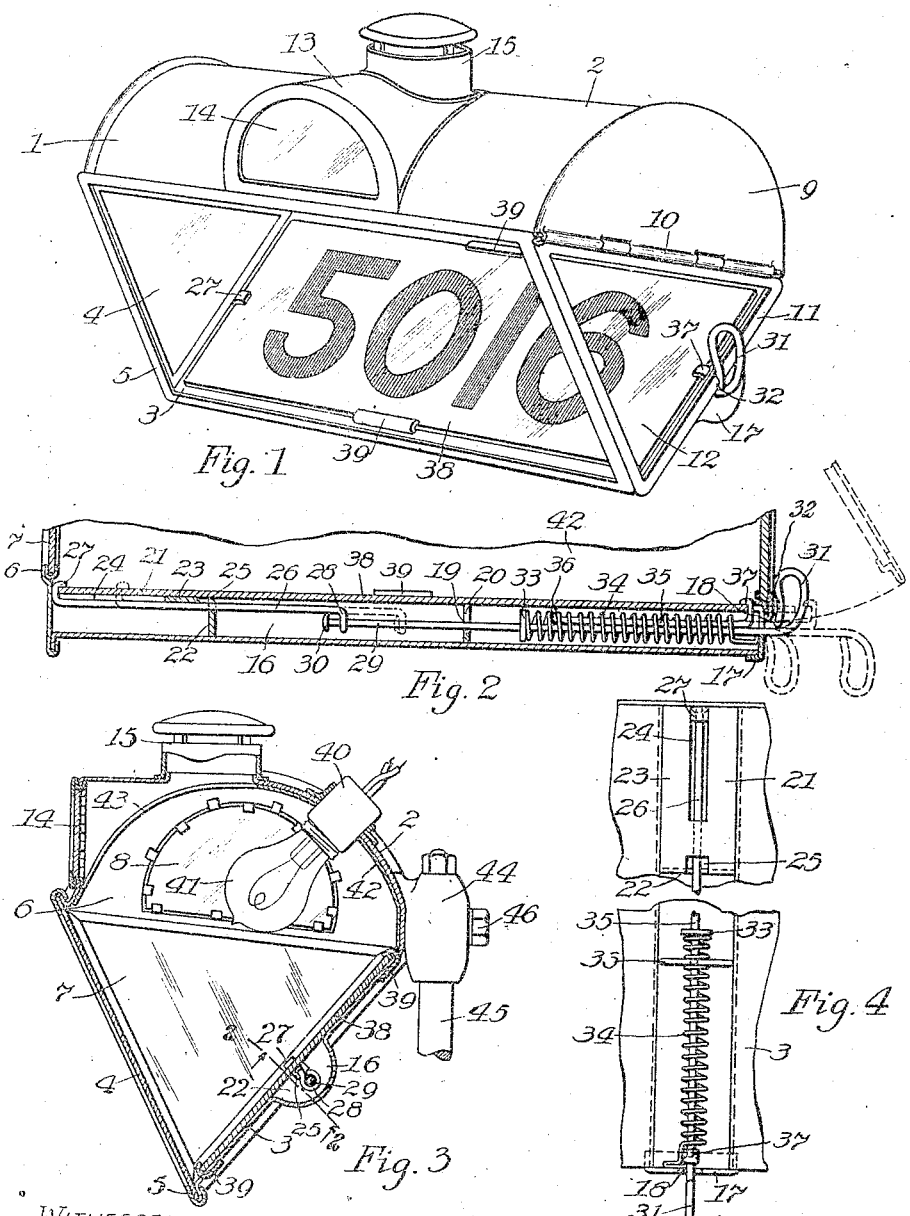

THEODORE SCHWAB, OF HIGHLAND PARK, MICHIGAN.

ILLUMINATED-LICENSE-TAG HOLDER.

1,115,585.　　　Specification of Letters Patent.　　Patented Nov. 3, 1914.

Application filed February 26, 1914. Serial No. 821,133.

*To all whom it may concern:*

Be it known that I, THEODORE SCHWAB, a citizen of the United States, residing at Highland Park, in the county of Wayne, State of Michigan, have invented certain new and useful Improvements in Illuminated-License-Tag Holders; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to an illuminated license holder for motor vehicles, and consists in the construction and arrangement of parts as hereinafter more fully set forth and pointed out particularly in the claims.

The object of the invention is to provide an illuminated license holder of comparatively simple and inexpensive construction, in which the arrangement is such as to afford a rear signal light for the vehicle, and at the same time provide means for containing and effectively illuminating the license number of the vehicle to protect and preserve said license tag against being soiled by mud and dust, so that the number thereon will be clearly visible at all times. Provision is also made for enabling the license plate to be readily inserted and removably held in position within the housing or holder in conjunction with means for locking the closure to the entrance of said housing so as to retain the parts securely against liability to rattle. The above object is attained by the employment of the construction and arrangement of parts illustrated in the accompanying drawings, in which:

Figure 1 is a perspective view of the holder showing the license tag in position therein as it would appear in operation. Fig. 2 is a central longitudinal section through the back of the housing and license tag therein taken on dotted line 2—2 of Fig. 3, showing in elevation the spring actuated means for locking and releasing the license tag, and for locking and releasing the closure or door of the holder. Fig. 3 is a central transverse section through the body of the housing and license tag therein. Fig. 4 is a fragmentary plan view of the spring actuated locking means contained within a depression in the back of the housing.

Referring to the drawings by the characters of reference marked thereon, 1 designates the body or housing of the holder which is oblong in general shape, and which comprises a rounded top portion with inclined back and front portions diverging therefrom and joining each other at their lower edges, being provided also with a closed end and an open end having a closure therefor in the form of a door for closing the entrance to the interior of the housing.

The body of the housing is preferably formed from a single piece of metal bent to form the rounded or concavo convex top portion 2, and extending downwardly and forwardly therefrom to form the inclined back portion 3. The front of the housing consists of a pane of glass 4 set in a rectangular frame 5 which joins at its upper edge the forward edge of the rounded top portion 2 and is joined at its lower edge to the lower edge of the inclined back portion 3, and stands at an opposite incline to the incline of said back. Said rectangular frame is joined to the housing by overlapping its outer edges upon the flange edges of said top and back portion, as shown in Fig. 2, or by otherwise suitably securing the parts at their points of juncture.

One end of the housing is closed by an end plate 6 having a triangular pane of glass 7 set in its lower portion, and in its upper rounded portion a semi-circular colored signal pane of glass 8 is set and suitably secured. The opposite upper end portion of said housing is closed by a semi-circular plate 9 which is secured to the end of the rounded portion 2. Hinged at one edge to the lower edge of said end plate, as at 10, is a triangular frame 11 having a pane of glass 12 set therein to form a door for closing the triangular entrance to said housing. Projecting centrally from the front side of the rounded top 2 of the housing is a raised portion in the form of a dormer 13 communicating with the interior of said housing, and in the front of which a semi-circular colored signal pane of glass 14 is set. Extending vertically from said top portion, adjoining said dormer and communicating with the interior of said housing, is a ventilating capped dome 15.

Formed centrally in the back wall 3 of the housing by depressing the metal longitudinally thereof is a concavity 16, the rear end of which is closed by an extension of the end wall 6 and the forward end of said concavity is closed by a cap 17 having a slotted aperture 18 formed centrally in the upper edge thereof. Extending transversely across said concavity, midway its length, is a partition 19 having a slotted aperture 20 formed centrally therein. Lying within said concavity at the rear end thereof is an angle plate 21, the vertical portion 22 of which extends in the form of a partition across said concavity, and the horizontal portion 23 of said plate abridges said concavity on the plane of the face of the back plate 3 and is provided centrally therein with an elongated aperture 24, while an aperture 25 is also formed through said plate at the angle of juncture with the vertical portion 22.

Lying within the concavity 16 and extending through the aperture 25 of the plate 21 is a wire or rod 26, the rear end of which extends upwardly through the aperture 24 of the plate 21 and terminates in the form of a hook 27 extending above the plane of the back wall 3. The forward end of said rod extends downwardly at a right angle to the body portion and terminates in the form of an eye 28 through which a wire or rod 29, having a head 30 on the end thereof, freely passes, and extending through the aperture 20 of the partition 19 said rod passes outwardly through the aperture 18 of the cap 17 of said concavity and terminates in an upturned loop portion 31 forming a shoulder for engagement with a notch 32 in the frame 11 of the door of the housing. Interposed between and abutting at its ends the inner face of the cap 17 and a washer 33 secured to the rod 29, is a compression coil spring 34, which surrounds said rod and exerts an endwise tension thereon to hold its looped ends 31 in contact with the frame of the door, whereby a spring tensioned latch is provided for holding said door closed against the end of the housing.

Inserted within the coiled spring 31 and lying parallel with the rod 29 therein, is a rod 35, the inner end of which passes upward between the coils of the spring at a point nearer the inner end thereof and terminates in a laterally folded portion 36 which extends across and engages at its ends the opposite side walls of the concavity 16 to retain said rod against a rotary movement and permit it to move endwise with the action of the spring. The outer end of said rod is turned upwardly and terminates in a hook 37 extending above the plane of the back of the housing at a point therein in line with the aperture 18 of the cap 17 of said concavity, as clearly shown in Figs. 2 and 4. Lying upon the face of the inclined back 3 of the housing, and engaged at its inner end by the hook 27 of the rod 26 and at its outer end by the hook 37 of the rod 35, is a plate or tag 38, upon the face of which the license number is printed. Engaging said tag at its edges upon opposite sides are overlapping metal clips 39 which are secured to the back wall 3 of the housing, and between which and the overlapping edges of said clips said tag is held against lateral movement but is permitted to slide freely therein. The tension of the coil spring exerted upon the rod 35, which engages at its hooked end 37 with one end of said tag, forces said tag endwise of the housing and carries the hook 27 which engages the opposite end of said tag against the end wall 6 of the housing, whereby said tag is securely held in position under a spring tension which overcomes the liability to rattle through the jar and vibration imparted thereto by the vehicle to which the housing is attached (see Figs. 1 and 2).

As a means for illuminating the interior of the housing a socket 40 wired for connection with a source of electricity is secured centrally through the back curved wall 2 of the housing for the reception of an electric light bulb 41, which depends therefrom into the circular concavity of said housing above said license tag, and surrounding the inner face of the concavity of the top portion 2 is a curved reflector 42 having an aperture 43 formed therethrough which communicates with the dormer 13 and the ventilator 15 on said housing, whereby the rays of light from said bulb will be projected through the colored signal glass 8 in the end of the housing and through the colored signal glass 14 in said dormer, and ventilation for the heat of the light will be afforded through the ventilator dome. Light will also be strongly reflected by the curved body of said reflector directly upon the face of the license tag to brightly illuminate it and enable the numbers thereon to be clearly visible at night through the transparent front and ends of the housing, as clearly shown in Figs. 1 and 3. To provide for supporting the housing, a socket 44 is secured to the back wall thereof for the reception of a standard 45 attached to the vehicle, and to which said socket is secured by means of a set screw 46.

The device being thus constructed, the operation of inserting and removing the license tag will be as follows: The upturned loop portion 31 of the spring tensioned rod 29 is swung downwardly out of engagement with the notch 32 in the frame of the door 11, when said door frame may be swung upwardly upon its hinge, as indicated by dotted lines in Fig. 2. Said rod is then pulled outwardly by means of the loop 31 against the tension of the spring 34, and as said spring contracts the hooked end 37 of the rod 35 will be carried outwardly and away from the hook 27 until the head 30 of the rod 29 engages the eye 28 of the rod 26, when the hook 27 on said rod will be drawn outwardly and longitudinally of the aperture 24 of the angle plate 21, as indicated by dotted lines in Fig. 2. The license tag or plate 38 may then be inserted between the side loops 39 of the back of the housing until the inner end of said tag is engaged by the hook 27, when by releasing the outward tension upon the looped rod 29 said rod will be drawn inwardly by the expansion of the spring 34, which carrying with it the rod 35 will cause its hooked end 37 to engage the outer end of the license tag and draw said tag into position within the housing as the looped end of the rod 29 is drawn into contact with the end cap 17. The door may be closed and the loop 31 swung into position in engagement with the notch 32 therein, whereby said door and license tag will be firmly held in position under the expanding tension of said spring, as clearly shown in Fig. 1.

Having thus fully set forth my invention, what I claim as new, and desire to secure by Letters Patent, is:

1. In a device comprising a license tag in a holder therefor, the combination of a housing having an elongated curved top, a downwardly and forwardly inclined back extending from said top, a downwardly and rearwardly inclined transparent front connecting said back and top, one end of said housing being closed, a closure for the other end of said housing, the closed end and the closure each having transparencies therein, a license tag mounted upon said inclined back in said housing within the range of vision through the transparent front and ends of said housing, a reflector in said housing, and a lamp for illuminating said housing disposed between said reflector and said license tag.

2. In a device comprising a license tag in a holder therefor, the combination of a housing having a wall with a concavity therein, a removable plate mounted on said wall within said housing, a slidable rod in said concavity having a hook engaging one end of said removable plate, a spring tensioned rod in said concavity having a hook engaging the other end of said removable plate, a spring tensioned actuating rod in said concavity having engagement with said spring tensioned rod and said slidable rod for releasing the hook of said spring tensioned rod from engagement with said removable plate and for actuating said slidable rod to withdraw said removable plate from said housing.

In testimony whereof, I sign this specification in the presence of two witnesses.

THEODORE SCHWAB.

Witnesses:
B. F. WHEELER,
M. E. BROESAMLE.